(12) United States Patent
Sano et al.

(10) Patent No.: US 9,126,635 B2
(45) Date of Patent: Sep. 8, 2015

(54) COWL SECTION STRUCTURE FOR VEHICLE

(71) Applicant: NIHON PLAST CO., LTD., Fujinomiya-shi, Shizuoka (JP)

(72) Inventors: Chikara Sano, Fujinomiya (JP); Masanori Hirano, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/554,744

(22) Filed: Nov. 26, 2014

(65) Prior Publication Data

US 2015/0151791 A1 Jun. 4, 2015

(30) Foreign Application Priority Data

Nov. 29, 2013 (JP) .................................. 2013-247785

(51) Int. Cl.
*B62D 25/00* (2006.01)
*B62D 25/08* (2006.01)
(52) U.S. Cl.
CPC .................... *B62D 25/081* (2013.01)
(58) Field of Classification Search
CPC .................................................. B62D 25/081
See application file for complete search history.

(56) References Cited

U.S. PATENT DOCUMENTS

| 2003/0107243 A1* | 6/2003 | Hayashi | 296/192 |
| 2005/0067859 A1* | 3/2005 | Yoshii et al. | 296/192 |
| 2009/0152897 A1* | 6/2009 | Jang | 296/192 |
| 2010/0187862 A1* | 7/2010 | Kurata et al. | 296/192 |
| 2013/0057027 A1* | 3/2013 | Matsubara | 296/192 |

FOREIGN PATENT DOCUMENTS

JP 2011-520694 A 7/2011

* cited by examiner

*Primary Examiner* — Lori L Lyjak
(74) *Attorney, Agent, or Firm* — Marvin A. Motsenbocker; Mots Law, PLLC

(57) ABSTRACT

A cowl section structure for a vehicle includes a cowl top cover arranged between a bonnet and a windshield and a contact piece portion. The cowl top cover includes a windshield fitting member provided to a lower end portion of the windshield and a protruding claw extending in a direction in which the protruding claw is inserted into an engagement recessed portion of the windshield fitting member. The contact piece portion is arranged in a space between the protruding claw and the engagement recessed portion. One end of the contact piece portion comes into contact with a tip end portion of the protruding claw. An opposite end of the contact piece portion comes into contact with an inner wall of the engagement recessed portion of the windshield fitting member.

4 Claims, 5 Drawing Sheets

COWL SECTION STRUCTURE FOR VEHICLE

CROSS REFERENCE TO RELATED APPLICATION

This application is based upon and claims the benefit of priority from the prior Japanese Patent Application No. 2013-247785, filed on Nov. 29, 2013, the entire contents of which are incorporated herein by reference.

BACKGROUND

1. Technical Field

The disclosure relates to a cowl section structure for a vehicle.

2. Related Art

There is a cowl top cover arranged between a windshield and a bonnet for covering an engine compartment of a vehicle, and configured to cover a cowl section provided between the engine compartment and the windshield. The cowl top cover is attached such that the cowl top cover engages with a front end portion of the windshield, covers a space from the front end portion of the windshield to a rear end portion of the bonnet, and extends across the width of the vehicle. The cowl top cover improves the external appearance of the vehicle by covering an air box which is provided between vehicle panels on the rear end of the engine compartment and a cowl top panel configured to support the windshield. In addition, an air intake communicating with the air box configured to take external air into the vehicle compartment is formed in the cowl top cover.

The cowl top cover includes a plate-shaped cover body configured to cover the cowl section. A rear end portion of the cover body is connected to the front end portion of the windshield by being fitted, etc., to the front end portion of the windshield. Thereby, the cover body prevents rainwater and the like from entering the engine compartment. Furthermore, the cover body is attached to a vehicle body with a front lower portion of the cover body fixedly supported by a vehicle body panel. An elastically-deformable seal member is attached in a way that the seal member extends to the left and right ends of the cowl top cover. The seal member is designed in a way that the raised portion of the seal member, as being in intimate contact with the rear-end lower surface of the closed bonnet, blocks heat and smell from the engine compartment.

With this structure, even though rainwater, dust and the like stay on the upper surface of the cowl top cover exposed to the outside, the seal member can block the rainwater, dust and the like, as well as prevent the rainwater, dust and the like from entering the engine compartment. Furthermore, the seal member can prevent heat and smell, which are produced inside the engine compartment, from being discharged to the outside through cowl top cover.

Japanese Patent Translation Publication No. 2011-520694 describes a fitting structure in which a terminal end portion of the cowl top cover is attached to a windshield fitting section. FIG. 1 is a cross-sectional view of the windshield fitting section included in the related cow top cover, take in the front-rear direction of the vehicle. FIG. 2 is a detailed diagram showing how water flows around the windshield fitting section included in the related cowl top cover, viewed in the left-right direction of the vehicle. In the drawings, the frontward direction, the rearward direction, the upward direction and the downward direction are denoted by reference signs FR, RR, UP and DN, respectively.

In FIG. 1, a windshield fitting member 10 plays a role in connecting a windshield 40 to a cowl top cover general surface 50. The windshield 40 is, for example, formed from laminated glass, and is attached to a vehicle body of a vehicle, albeit not illustrated. The cowl top cover general surface 50 is, for example, formed from synthetic resin or the like. An upper end portion 53 of the cowl top cover general surface 50 is connected to a lower end portion 42 of the windshield 40, and the cowl top cover general surface 50 discharges water, which is flowing out from the windshield 40, to the outside. An outer surface portion 50a of the cowl top cover general surface 50 is almost flush with an outer surface portion 40a of the windshield 40.

The length of the windshield fitting member 10 in a vehicle widthwise direction is equivalent to the width of the windshield 40, or the width of the cowl top cover general surface 50. A first portion 20 of the windshield fitting member 10 includes a fixation surface 22 configured to fix the windshield 40. An adhesive layer 24, such as a piece of double-side adhesive tape, is formed on the fixation surface 22. Along the lower end portion 42 of the windshield 40, the windshield fitting member 10 together with the adhesive layer 24 is pressed against a back surface portion 40b of the windshield 40, and bonded to the back surface portion 40b.

The windshield fitting member 10 includes a second portion 30. The second portion 30 includes an engagement recessed portion 60 configured to enable the cowl top cover general surface 50 to be attached to and detached from the second portion 30. The cowl top cover general surface 50 has a protrusion 51, which is formed in a recessed or projecting shape, on its back surface. The protrusion 51 has elasticity, and is designed to be brought into engagement with, or fitted into the engagement recessed portion 60. The protrusion 51 extends in a joining direction R1 which is almost vertical to the outer surface portion 50a of the cowl top cover general surface 50, or the outer surface portion 40a of the windshield 40.

The windshield 40, the windshield fitting member 10 and the cowl top cover general surface 50 are arranged in a way that allows the protrusion 51 to be inserted into the engagement recessed portion 60 of the windshield fitting member 10 in the joining direction R1, and to be released from its engagement in a direction R2 opposite to the joining direction R1.

The engagement recessed portion 60 is defined by: a spring-like leg portion 62 shaped almost like the letter L, the letter U, or a hook; and a protrusion 80 formed between the first portion 20 and the second portion 30 of the windshield fitting member 10. An engagement opening portion 61 into which to insert the protrusion 51 is formed by the protrusion 80 and a free end 64 of the spring-like leg portion 62.

The cross section of the protrusion 80 is shaped like a wedge and/or the letter T. A seal member 90 configured to cover the windshield 40 and the cowl top cover general surface 50 is provided in a transition area between the windshield 40 and the cowl top cover general surface 50. Between the lower end portion 42 of the windshield 40 and the inwardly-projecting protrusion 51 of the cowl top cover general surface 50, a part of the protrusion 80 forms a holding body or a supporting body configured to support the seal member 90 through a flat portion 91 of the seal member 90.

A tip end portion 92 of the seal member 90 is in intimate contact with the lower end portion 42 of the windshield 40. After the attachment of the cowl top cover general surface 50, the seal member 90 is attached by pressure between the lower end portion 42 of the windshield 40 and the upper end portion 53 of the cowl top cover general surface 50 in a way that an outer surface portion (not illustrated) of the seal member 90 is connected to, and flush with, the outer surface portion 40a of the windshield 40 and the outer surface portion 50a of the cowl top cover general surface 50. Accordingly, the transition area between the windshield 40 and the cowl top cover general surface 50 is almost smooth and flush with the windshield 40 and the cowl top cover general surface 50.

Below the lower end portion 42 of the windshield 40, a cavity portion 84 is formed by the protrusion 80 and the first portion 20 of the windshield fitting member 10. The cavity portion 84 enables elastic flexure of the protrusion 80 as supported by the windshield 40 after attached to the windshield 40.

Inside the engagement recessed portion 60, the spring-like leg portion 62 has an engagement surface 63 on its free end 64. The engagement surface 63 is designed to be put into engagement with an engagement surface 52 formed on the protrusion 51 at a position where the cowl top cover general surface 50 is attached. For this reason, the protrusion 51 is always in engagement with and/or fitted in the engagement recessed portion 60 of the windshield fitting member 10. An inclined surface (not illustrated) is formed on the engagement surface 52 and the free end 64 in order for the protrusion 51 to be inserted into the engagement recessed portion 60 in a better condition. Inside the engagement recessed portion 60, an engagement surface 83 is formed on the protrusion 80 as well.

A lock member 70 is provided for the purpose of materializing a simple configuration which does not require the cowl top cover general surface 50 to be bonded to the windshield fitting member 10 or the windshield 40. The lock member 70 is formed as a protrusion inside the engagement recessed portion 60 in away that the lock member 70 extends in the longitudinal direction of the windshield fitting member 10. At least apart of the lock member 70 is elastically deformable. The lock member 70 is formed in a way that the protrusion 51 of the cowl top cover general surface 50 can be inserted into the engagement recessed portion 60 in the joining direction R1 with relative ease, and in a way that the protrusion 51 is hard to release from its engagement with the engagement recessed portion 60 in the R2 direction.

As shown in FIG. 1, the lock member 70 is arranged at an acute angle to the protrusion 51 inside the engagement recessed portion 60. The lock member 70 is designed in a way that: at least its part projects toward the engagement opening portion 61 of the engagement recessed portion 60; and the part is in engagement with and/or fitted in the protrusion 51 inside the engagement recessed portion 60. Thereby, the cowl top cover general surface 50 is detachably and continuously fixed at its attachment place.

In order to make this possible, a curved end portion 71 is formed on a longitudinal-direction end surface 72 of the lock member 70, and the engagement surface 52 is formed on the protrusion 51. This design causes a free end or the curved end portion 71 of the lock member 70 to support the protrusion 51 in the longitudinal direction of the windshield fitting member 10, too, at the position of the attachment of the cowl top cover general surface 50 is attached. Accordingly, this design ensures the stable engagement.

On the engagement surface 83 of the protrusion 80, the lock member 70 is fixed to the protrusion 80, as in the case of the seal member 90. The lock member 70 has a narrow portion 74 between the curved end portion 71 and a joining area 73 which is joined to the protrusion 80, and the cross section of the lock member 70 is shaped almost like a recess. When the protrusion 51 is inserted into the engagement recessed portion 60, this cross section makes the lock member 70 retreat sideway, or in a direction at a right angle to the longitudinal direction of the lock member 70. For the purpose of supporting such an effect, an inclined surface 55 configured to press the lock member 70 sideway is formed in an end portion of the protrusion 51.

SUMMARY

A related cowl top cover related to the present invention includes: an insertion hole into which to insert a turn shaft of a windshield wiper; a driving shaft configured to drive the wiper; a ventilation slit configured to take external air into the vehicle compartment; and a drainage guide groove. If rainwater and dust enter the inside through the peripheries of these openings, gaps between the cowl top cover and the cowl top section, the rainwater and dust reach an air conditioning box unit along the cowl top section. For the purpose of protecting the air conditioning box unit and the like, and preventing the entrance of the rainwater and dust, the cowl top cover configured to cover the cowl top section is attached to the upper surface of the cowl top section, and extends almost the full width of the vehicle, as described above.

The lower end portion of the windshield is hermetically supported by the cowl top cover. Water is likely to enter the inside of the cowl top cover through gaps between the lower end portion of the windshield and the cowl top cover, when deterioration occurs in the seal member configured to hermetically support the lower end portion of the windshield, when water streams strongly hit the windshield during high-speed car washing or in rainy weather, when snow piles between the lower end portion of the windshield and the cowl top cover, etc.

In addition, a related windshield fitting member 10 disclosed in Japanese Patent Translation Publication No. 2011-520694 employs a structure in which the protrusion 51 of the cowl top cover general surface 50 is inserted into and fitted into the engagement recessed portion 60 of the windshield fitting member 10. In other words, the fitting structure for the windshield fitting member 10 and the cowl top cover general surface 50 is designed in a way that the protrusion 51 of the cowl top cover general surface 50 is fitted to lock portions respectively in: a vehicle upper surface-side part of the protrusion 80 of the windshield fitting member 10 (the part thereof which is situated near the upper end portion 53 of the cowl top cover general surface 50); a vehicle front-side part of the windshield fitting member 10 (the engagement surface 63); and an undersurface-side (vehicle rear-side) part of the protrusion 80 of the windshield fitting member 10 (corresponding to the curved end portion 71 of the lock member 70).

As shown in FIG. 2, contact parts, which are put into contact with the protrusion 51 when the protrusion 51 of the cowl top cover general surface 50 is inserted into the engagement recessed portion 60 of the windshield fitting member 10, are located in: the vehicle upper surface-side part (corresponding to the upper end portion 53); the vehicle front-side part (the engagement surface 63); and the vehicle rear-side part (corresponding to the curved end portion 71 of the lock member 70) (which are all marked by the letter X in FIG. 2). The structure is designed in a way that water is blocked by the contact parts.

In some cases, meanwhile, the area of alignment between the engagement recessed portion 60 of the windshield fitting member 10 and the protrusion 51 of the cowl top cover general surface 50 may lose its fully hermetic condition due to variations in the engagement recessed portion 60 of the windshield fitting member 10, variations in the protrusion 51 of the cowl top cover general surface 50, and variations in an outer cowl top panel with which to attach the cowl top cover to the rear end of the engine compartment. In such cases, a phenomenon is likely to take place in which: as indicated with an arrow Y1 in FIG. 2, water enters through the lock portion of the vehicle upper surface-side part (corresponding to the upper end portion 53); and after entering the inside of the engagement recessed portion 60 of the windshield fitting member 10, the water flows out through the vehicle front-side part (the engagement surface 63) without staying in the inside thereof.

As a result, a wiper component 96 arranged under a portion of the windshield fitting member 10 in the frontward direction of the vehicle is likely to be splashed with water, and water is likely to enter the inside of an air intake 98 which is a port through which to take air in.

Furthermore, when load is put onto the cowl top cover general surface 50 due to the weight of a pile of snow, force inputted through a bonnet, or the like, the load is likely to affect the gap and the surface difference between the engagement recessed portion 60 of the windshield fitting member 10 and the protrusion 51 of the cowl top cover general surface 50. As a result, in some cases, the water is insufficiently prevented from entering the engagement recessed portion 60 of the windshield fitting member 10, and the momentum of the entering water is insufficiently inhibited.

An object of the present invention is to provide a cowl section structure for a vehicle which is capable of: blocking, or inhibiting the momentum of, water which once enters the gap between the cowl top cover general surface and the windshield fitting member, even if load is put onto the cowl top cover general surface; and preventing the wiper component from being splashed with water, and water from entering the air intake.

A cowl section structure for a vehicle in accordance with some embodiments includes a cowl top cover arranged between a bonnet and a windshield and a contact piece portion. The cowl top cover includes a windshield fitting member provided to a lower end portion of the windshield and a protruding claw extending in a direction in which the protruding claw is inserted into an engagement recessed portion of the windshield fitting member. The contact piece portion is arranged in a space between the protruding claw and the engagement recessed portion. One end of the contact piece portion comes into contact with a tip end portion of the protruding claw. An opposite end of the contact piece portion comes into contact with an inner wall of the engagement recessed portion of the windshield fitting member.

In a cross-sectional view in a front-rear direction of the vehicle, the contact piece portion may have a linear shape extending in a same direction as the direction in which the protruding claw is inserted into the engagement recessed portion.

In a cross-sectional view in a front-rear direction of the vehicle, the contact piece portion may have a shape having a curvature in any one of a frontward direction or a rearward direction of the vehicle.

The contact piece portion may be formed integrally to the protruding claw as a single member, and project from the tip end portion of the protruding claw.

Even if load is put onto the cowl top cover general surface, the foregoing configuration is capable of: blocking, or inhibiting the momentum of, water which once enters the gap between the cowl top cover general surface and the windshield fitting member, even if load is put onto the cowl top cover general surface; and preventing the wiper component from being splashed with water, and water from entering the air intake.

DETAILED DESCRIPTION

Figure 1:
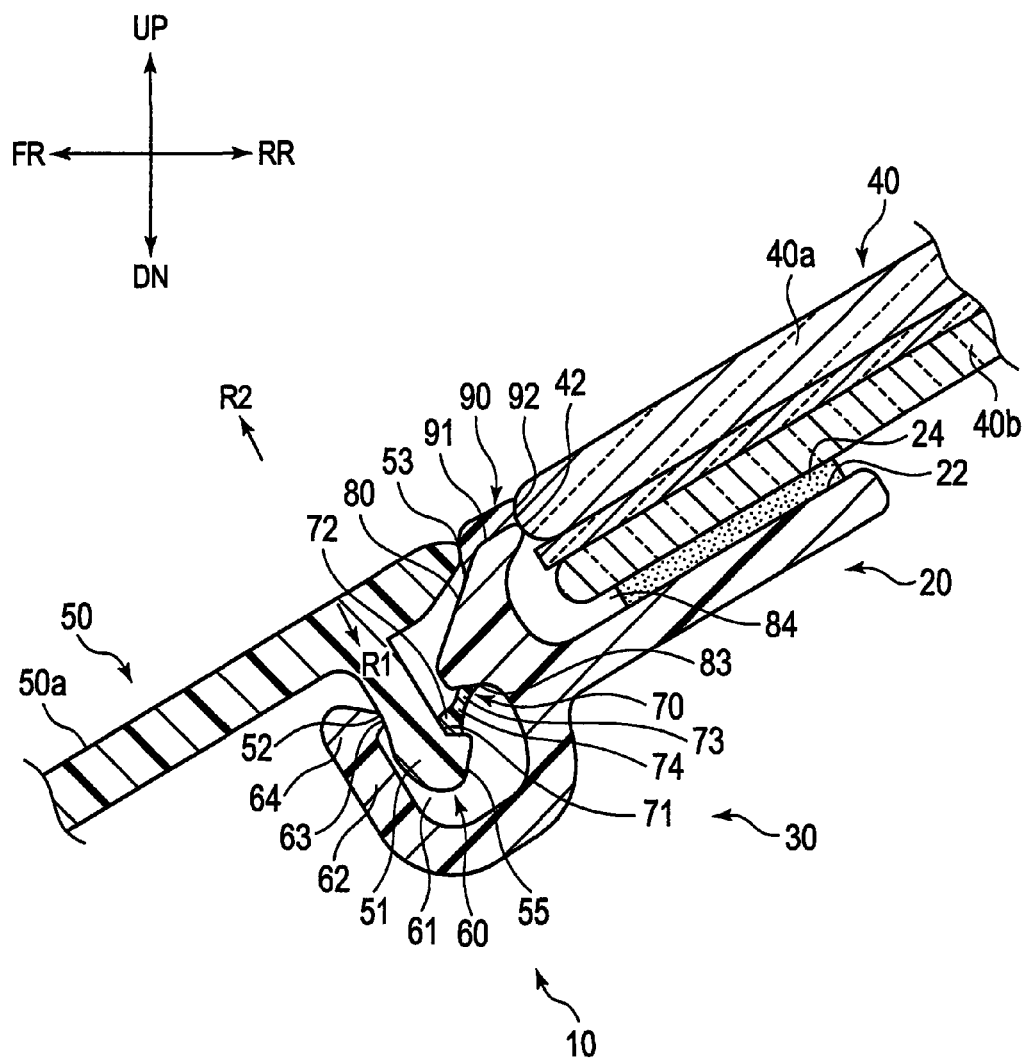
FIG. 1 is a cross-sectional view of a windshield fitting section of a related cowl top cover, taken in the front-rear direction of a vehicle.

Referring to the drawings, detailed descriptions will be provided for an embodiment of the present invention. It should be noted that: throughout the drawings, the same or corresponding parts are denoted by the same reference signs; and duplicated explanations will be simplified or omitted as appropriate. Furthermore, the terms "the front-rear direction," "the upward-downward direction" and "the vehicle widthwise direction" used in the following descriptions, respectively, represent: a forward advancing direction in which the vehicle moves straight ahead, a direction of the forward advancement of the vehicle from behind the vehicle; a direction vertical from the vehicle; and the left-right direction viewed from the front of the vehicle. In the drawings, frontward, rearward, upward and downward directions are denoted by reference sings FR, RR, UP and DN, respectively.

Descriptions will be provided for an embodiment of the present invention, citing a cowl top cover, particularly a cowl top cover to be installed in a vehicle or the like.

Figure 3:
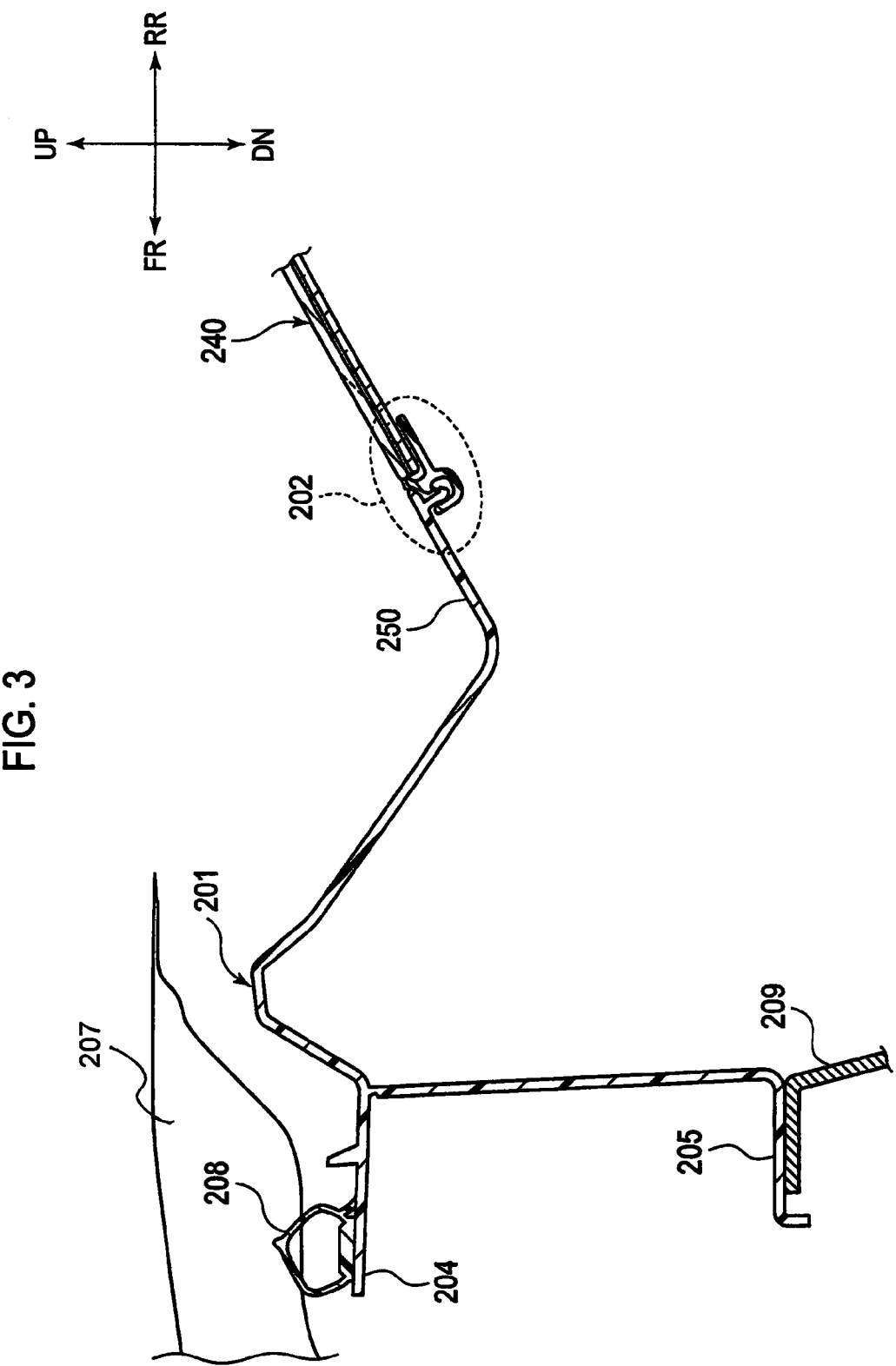
FIG. 3 is a cross-sectional view of a cowl top cover of an embodiment, taken in the front-rear direction of a vehicle.
Figure 4:
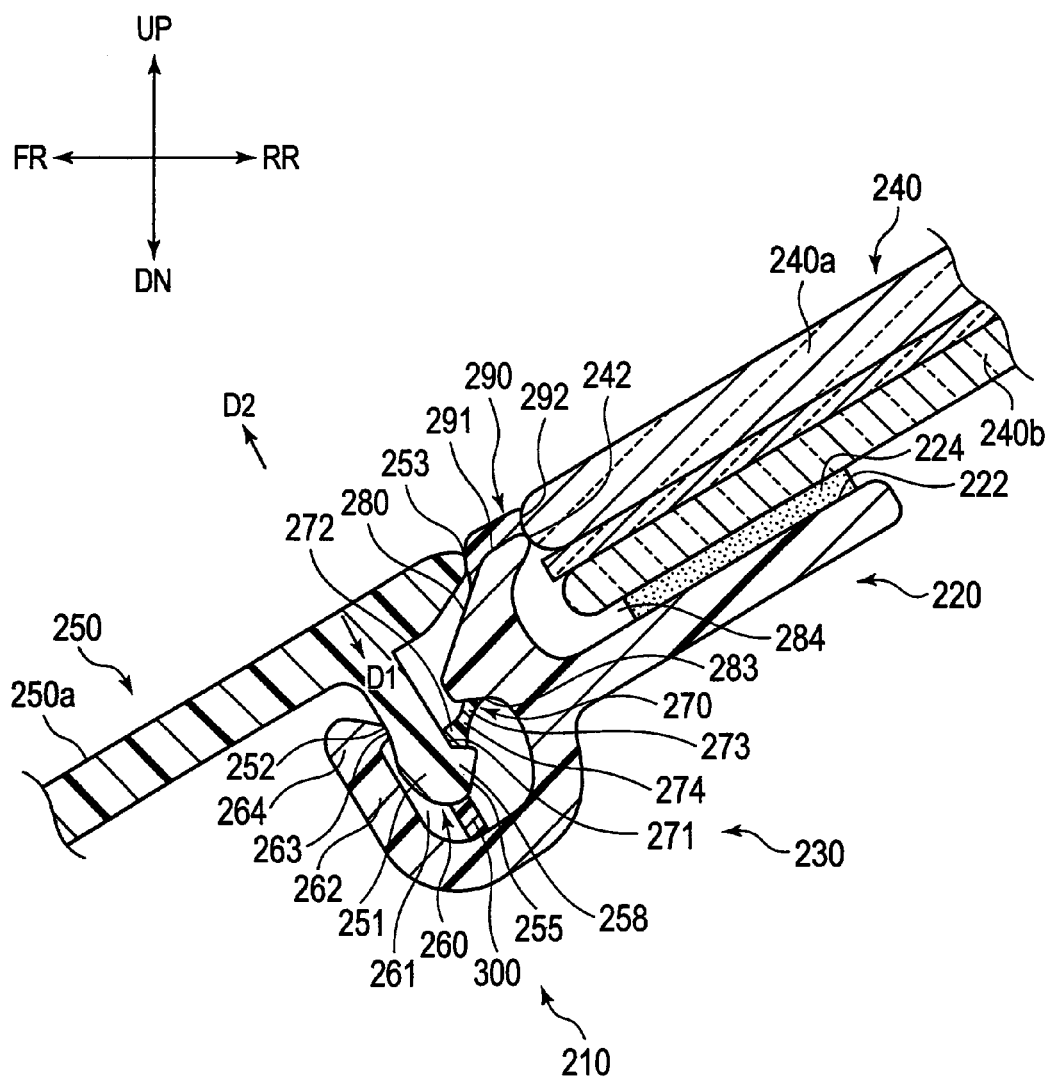
FIG. 4 is a cross-sectional view of a windshield fitting section of the cowl top cover of the embodiment, taken in the front-rear direction of the vehicle.

To begin with, descriptions will be provided for a cross section of a cowl top cover 201 of the embodiment which is taken in the front-rear direction of the vehicle, and a cross section of a windshield fitting section 202 included in the cowl top cover 201 which is taken in the front-rear direction of the vehicle. FIG. 3 is a cross-sectional view of the cowl top cover 201 of the embodiment which is taken in the front-rear direction of a vehicle. FIG. 4 is a cross-sectional view of the windshield fitting section 202 of the cowl top cover 201 of the embodiment which is taken in the front-rear direction of the vehicle.

In the windshield fitting section 202, a fitting structure for a windshield 240 and a windshield fitting member 210 is that in which the windshield 240 and the windshield fitting member 210 are assembled together by inserting and fitting the windshield 240 into the windshield fitting member 210 with a back surface portion 240b of the windshield 240 bonded to the windshield fitting member 210 by use of an adhesive 224.

Ahead of the windshield fitting member 210 in the frontward direction of the vehicle, the structure includes: a cowl top cover general surface 250, a bonnet seal surface 204 to which to attach a bonnet seal 208 provided between the bonnet seal surface 204 and a bonnet 207 for the purpose of blocking (sealing) smell, noise and vibration from the engine compartment, as well as an outer cowl top panel attachment surface 205 to be attached to an outer cowl top panel 209, like other conventionally-used structures such as a windshield gripping structure and a thin-tip lip structure. The cowl top cover 201 includes a protrusion 251 which extends from the cowl top cover general surface 250 in a direction in which the protrusion 251 is inserted into an engagement recessed portion 260 of the windshield fitting member 210 windshield fitting member 210, which is almost the same direction as the cowl top cover 201 is inserted. A protruding claw 258 is formed in an end portion of the protrusion 251. In the windshield fitting section 202, when the protruding claw 258 of the protrusion 251 is inserted into the engagement recessed portion 260, the movement of the windshield 240 is restricted.

In FIG. 4, the windshield fitting member 210 plays a role in connecting the windshield 240 to the cowl top cover general surface 250. The windshield 240 is, for example, formed from laminated glass, and is attached to a vehicle body, albeit not illustrated. The cowl top cover general surface 250 is, for example, formed from synthetic resin or the like. An upper end portion 253 of the cowl top cover general surface 250 is connected to a lower end portion 242 of the windshield 240, and the cowl top cover general surface 250 discharges water, which is flowing out from the windshield 240, to the outside. An outer surface portion 250a of the cowl top cover general surface 250 is almost flush with an outer surface portion 240a of the windshield 240.

The length of the windshield fitting member 210 in a vehicle widthwise direction is equivalent to the width of the windshield 240, or the width of the cowl top cover general surface 250. A first portion 220 of the windshield fitting member 210 includes a fixation surface 222 configured to fix the windshield 240. An adhesive layer 224, such as a piece of double-side adhesive tape, is formed on the fixation surface 222. Along the lower end portion 242 of the windshield 240, the windshield fitting member 210 together with the adhesive layer 224 is pressed against a back surface portion 240b of the windshield 240, and bonded to the back surface portion 240b.

The windshield fitting member 210 includes a second portion 230. The second portion 230 includes an engagement recessed portion 260 configured to enable the cowl top cover general surface 250 to be attached to and detached from the second portion 230. The cowl top cover general surface 250 has the protrusion 251, which is formed in a recessed or projecting shape, on its back surface. The protrusion 251 has elasticity, and is designed to be brought into engagement with, or fitted into the engagement recessed portion 260. The protrusion 251 extends in a joining direction D1 which is almost vertical to the outer surface portion 250a of the cowl top cover general surface 250, or the outer surface portion 240a of the windshield 240.

The windshield 240, the windshield fitting member 210 and the cowl top cover general surface 250 are arranged in a way that allows the protrusion 251 to be inserted into the engagement recessed portion 260 of the windshield fitting member 210 in the joining direction D1, and to be released from its engagement in a direction D2 opposite to the joining direction D1.

The engagement recessed portion 260 is defined by: a spring-like leg portion 262 shaped almost like the letter L, the letter U, or a hook; and a protrusion 280 formed between the first portion 220 and the second portion 230 of the windshield fitting member 210. An engagement opening portion 261 into which to insert the protrusion 251 is formed by the protrusion 280 and a free end 264 of the spring-like leg portion 262.

The cross section of the protrusion 280 is shaped like a wedge or the letter T. A seal member 290 configured to cover the windshield 240 and the cowl top cover general surface 250 is provided in a transition region between the windshield 240 and the cowl top cover general surface 250. Between the lower end portion 242 of the windshield 240 and the inwardly-projecting protrusion 251 of the cowl top cover general surface 250, a part of the protrusion 280 forms a holding body or a supporting body configured to support the seal member 290 through a flat portion 291 of the seal member 290.

A tip end portion 292 of the seal member 290 is in intimate contact with the lower end portion 242 of the windshield 240. After the attachment of the cowl top cover general surface 250, the seal member 290 is attached by pressure between the lower end portion 242 and the upper end portion 253 of the cowl top cover general surface 250 in a way that an outer surface portion (not illustrated) of the seal member 290 is connected to, and flush with, the outer surface portion 240a of the windshield 240 and the outer surface portion 250a of the cowl top cover general surface 250. Accordingly, the transition area between the windshield 240 and the cowl top cover general surface 250 is almost smooth and flush with the windshield 240 and the cowl top cover general surface 250.

Below the lower end portion 242 of the windshield 240, a cavity portion 284 is formed by the protrusion 280 and the first portion 220 of the windshield fitting member 210. The cavity portion 284 enables elastic flexure of the protrusion 280 as supported by the windshield 240 after attached to the windshield 240.

Inside the engagement recessed portion 260, the spring-like leg portion 262 has an engagement surface 263 on its free end 264. The engagement surface 263 is designed to be put into engagement with an engagement surface 252 formed on the protrusion 251 at a position where the cowl top cover general surface 250 is attached. For this reason, the protrusion 251 is always in engagement with and/or fitted in the engagement recessed portion 260 of the windshield fitting member 210. An inclined surface (not illustrated) is formed on the engagement surface 252 and the free end 264 in order for the protrusion 251 to be inserted into the engagement recessed portion 260 in a better condition. Inside the engagement recessed portion 260, an engagement surface 283 is formed on the protrusion 280 as well.

A lock member 270 is provided for the purpose of materializing a simple configuration which does not require the cowl top cover general surface 250 to be bonded to the windshield fitting member 210 or the windshield 240. As a protrusion, the lock member 270 is formed inside the engagement recessed portion 260, and in a way that the lock member 270 extends in the longitudinal direction of the windshield fitting member 210. At least a part of the lock member 270 is elastically deformable. The lock member 270 is formed in a way that the protrusion 251 of the cowl top cover general surface 250 can be inserted into the engagement recessed portion 260 in the joining direction D1 with relative ease, and in a way that the protrusion 251 is hard to release from its engagement with the engagement recessed portion 260 in the D2 direction.

As shown in FIG. 4, the lock member 270 is arranged at an acute angle to the protrusion 251 inside the engagement recessed portion 260. The lock member 270 is designed in a way that: at least its part projects toward the engagement opening portion 261 of the engagement recessed portion 260; and the part is in engagement with and/or fitted in the protruding claw 258 of the protrusion 251 inside the engagement recessed portion 260. Thereby, the cowl top cover general surface 250 is detachably and continuously fixed at its attachment place.

In order to make this possible, a curved end portion 271 is formed on a longitudinal-direction end surface 272 of the lock member 270, and the engagement surface 252 is formed on the protrusion 251. This design causes a free end or the curved end portion 271 of the lock member 270 to support the protrusion 251 in the longitudinal direction of the windshield fitting member 210, too, at the position of the attachment of the cowl top cover general surface 250. Accordingly, this design ensures the stable engagement.

On the engagement surface 283 of the protrusion 280, the lock member 270 is fixed to the protrusion 280, as in the case of the seal member 290. The lock member 270 has a narrow portion 274 between the curved end portion 271 and a joining area 273 which is joined to the protrusion 280, and the cross section of the lock member 270 is shaped almost like a recess. When the protrusion 251 is inserted into the engagement recessed portion 260, this cross section makes the lock member 270 retreat sideway, or in a direction at a right angle to the longitudinal direction of the lock member 270. For the purpose of supporting such an effect, an inclined surface 255 configured to press the lock member 270 sideway is formed in an end portion of the protrusion 251.

Figure 2:
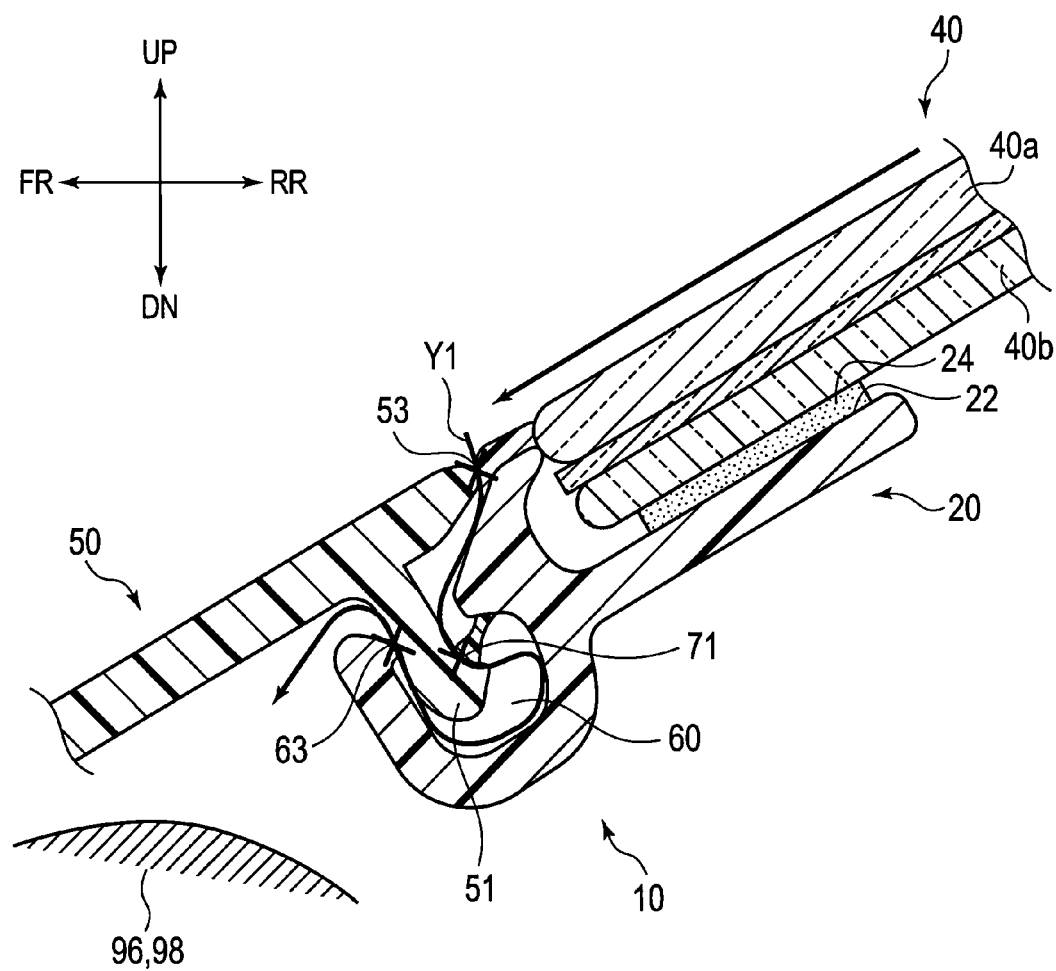
FIG. 2 is a detailed diagram showing how water flows around the windshield fitting section of the related cowl top cover, viewed in the left-right direction of the vehicle.

In the embodiment, as shown in FIG. 4, an elastic contact piece portion 300 is provided in a space formed between the protruding claw 258 of the protrusion 251 of the cowl top cover general surface 250 and the engagement recessed portion 260 of the windshield fitting member 210. Except for this point, the embodiment has, as described above, the same configuration as the related art shown in FIGS. 1 and 2, or uses the contents described in Japanese Patent Translation Publication No. 2011-520694. The contact piece portion 300 is formed in a way that: one end of the contact piece portion 300 comes into contact with an end portion of the protruding claw 258 which extends in almost the same direction as the protrusion 251 is inserted into the engagement recessed portion 260; and the opposite end of the contact piece portion 300 comes into contact with the inner wall of the windshield fitting member 210. For example, the contact piece portion 300 is projectingly provided to a tip end portion of the protruding claw 258. The contact piece portion 300 can be provided there without increasing steps in number by forming the contact piece portion 300 in a step of forming the protruding claw 258, particularly by forming the contact piece portion 300 from the same material as the protruding claw 258, for example, in a way that the contact piece portion 300 and the protruding claw 258 are integrated into a single member.

In FIG. 4, the contact piece portion 300 is shown as taking on a linear form, in a cross-sectional view of the contact piece portion 300 taken in the front-rear direction of the vehicle, albeit not illustrated. It should be noted, however, that the contact piece portion 300 does not have to take on the linear form. For example, the contact piece portion 300 may take on a form which has a curvature toward the front or rear of the vehicle, albeit not illustrated, or a curved form in the cross-sectional view of the contact piece portion 300 taken in the front-rear direction of the vehicle. Furthermore, the contact piece portion 300 may take on not only the linear form, but also a complicated form, such as shaped like bellows, as long as the complicated form allows the opposite end of the contact piece portion 300 to come into contact with the inner wall of the windshield fitting member 210 from the tip end of the protruding claw 258. In sum, the contact piece portion 300 may take on an arbitrary form as long as the form allows the opposite end of the contact piece portion 300 to come into contact with the inner wall of the windshield fitting member 210. Moreover, as long as the opposite end of the contact piece portion 300 can come into contact with the inner wall of the windshield fitting member 210, the contact piece portion 300 may undergo flexure when the protruding claw 258 is fitted into the windshield fitting member 210.

The windshield fitting member 210 employs a structure in which the protrusion 251 of the cowl top cover general surface 250 is inserted into and fitted into the engagement recessed portion 260 of the windshield fitting member 210. In other words, the fitting structure for the windshield fitting member 210 and the cowl top cover general surface 250 is designed in a way that the protrusion 251 of the cowl top cover general surface 250 is fitted to lock portions respectively in: a vehicle upper surface-side part of the protrusion 280 of the windshield fitting member 210 (the part thereof which is situated near the upper end portion 253 of the cowl top cover general surface 250); a vehicle front-side part of the windshield fitting member 210 (the engagement surface 263); an undersurface-side (vehicle rear-side) part of the protrusion 280 of the windshield fitting member 210 (corresponding to the curved end portion 271 of the lock member 270); and an inner wall of the windshield fitting member 210 (a part in contact with the contact piece portion 300).

Figure 5:
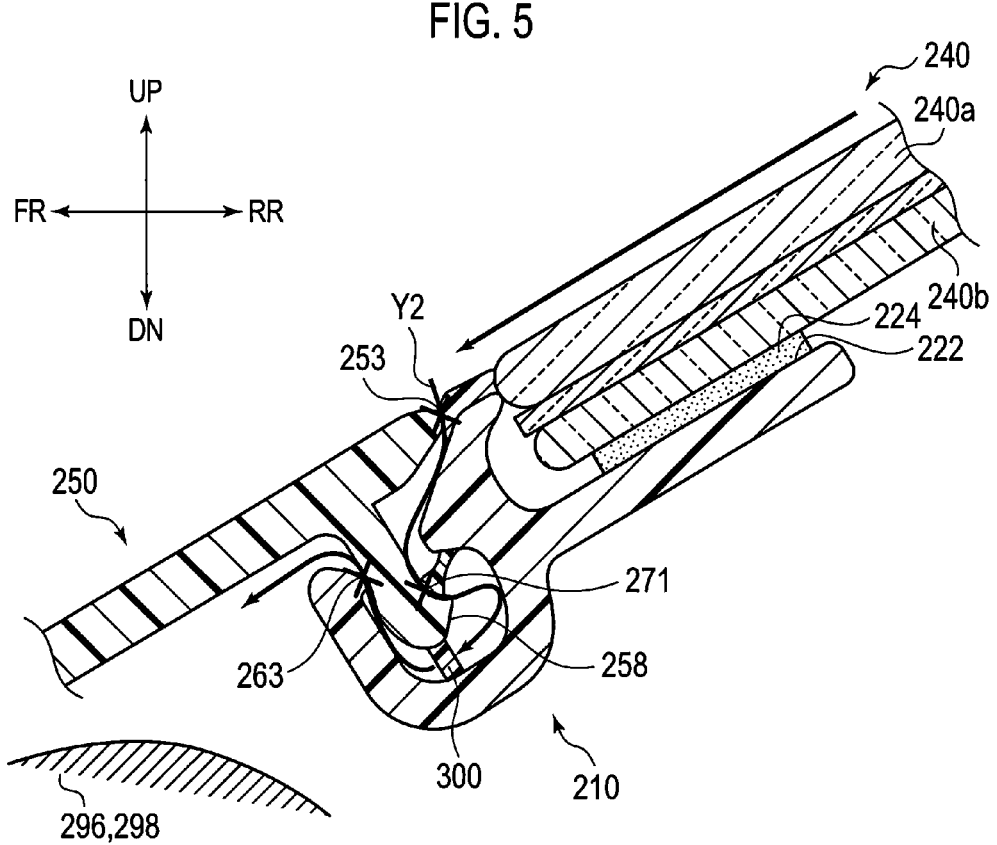
FIG. 5 is a detailed diagram showing how water flows around the windshield fitting section of the cowl top cover of the embodiment, viewed in the left-right direction of the vehicle.

In other words, as shown in FIG. 5, contact parts, which are put into contact with the protrusion 251 when the protrusion 251 of the cowl top cover general surface 250 is inserted into the engagement recessed portion 260 of the windshield fitting member 210, are located in: the vehicle upper surface-side part (corresponding to the upper end portion 253); the vehicle front-side part (the engagement surface 263); the vehicle rear-side part (corresponding to the curved end portion 271 of the lock member 270); and the inner wall of the windshield fitting member 210 (the part in contact with the contact piece portion 300), which are all marked by the letter X in FIG. 5). The structure is designed in a way that water is blocked by the contact parts.

In the embodiment, the tip end portion of the protruding claw 258 of the cowl top cover general surface 250 is provided with the contact piece portion 300 whose opposite end is put into contact with the inner wall of the windshield fitting member 210. Thereby, the embodiment brings about a seal effect in which water flowing, as indicated with an arrow Y2 in FIG. 5, into the gap between the cowl top cover general surface 250 and the windshield fitting member 210 can be blocked or made stagnant there. Since water can be blocked or made stagnant at the contact part between the inner wall of the windshield fitting member 210 and the opposite end of the contact piece portion 300 as well, the amount of water to flow to the vehicle front-side part (the engagement surface 263) becomes smaller than any of: the water flowing along the vehicle upper surface-side part (corresponding to the upper end portion 253); the amount of water flowing along the vehicle rear-side part (corresponding to the curved end portion 271 of the lock member 270). This makes it possible to inhibit the momentum and amount of water to flow out through the vehicle front-side part (the engagement surface 263), as well as thereby to prevent a wiper component 296 from being splashed with the water, and the water from entering an air intake 298.

In some cases, the area of alignment between the engagement recessed portion 260 of the windshield fitting member 210 and the protrusion 251 of the cowl top cover general surface 250 may lose its fully hermetic condition due to variations in the engagement recessed portion 260 of the windshield fitting member 210, variations in the protrusion 251 of the cowl top cover general surface 250, and variations in the outer cowl top panel 209 with which to attach the cowl top cover 201 to the rear end of the engine compartment. In such cases, even when, as indicated with the arrow Y2 in FIG. 5, water enters through the lock section in the vehicle upper surface-side part (corresponding to the upper end portion 253), the embodiment can inhibit water, which reaches the inside of the engagement recessed portion 260 of the windshield fitting member 210, from flowing out through the vehicle front-side part (the engagement surface 263) by blocking the water, or making the water stagnant, in a place short of the vehicle front-side part (the engagement surface 263).

Thereby, it is possible to prevent the wiper component 296, which is arranged under a portion of the windshield fitting member 210 in the frontward direction of the vehicle, from being splashed with water, and to prevent water from entering the inside of the air intake 298 which is a port through which to take air in.

Furthermore, when load is put onto the cowl top cover general surface 250 due to the weight of a pile of snow, force inputted through the bonnet 207, or the like, the load is likely to affect the gap and the surface difference between the engagement recessed portion 260 of the windshield fitting member 210 and the protrusion 251 of the cowl top cover general surface 250. Even in such a case, the embodiment can sufficiently prevent water from entering the engagement recessed portion 260 of the windshield fitting member 210, and sufficiently inhibit the momentum of the entering water.

Figure 6:
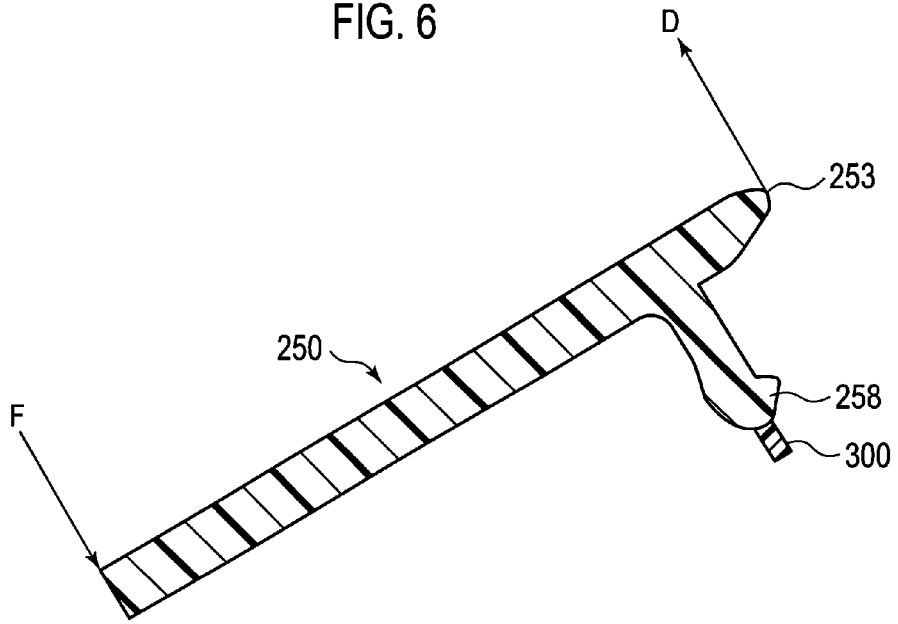
FIG. 6 is a diagram for explaining how a test was carried out on the windshield fitting section of the cowl top cover of the embodiment.

Next, referring to FIG. 6, descriptions will be provided for examples of secondary effects of the embodiment on the basis of an experiment with the windshield fitting section 202 of the cowl top cover 201.

When force F in the perpendicular direction was applied to a terminal end portion of the cowl top cover general surface 250 as fixed, an amount D of displacement of the upper end portion 253 of the cowl top cover general surface 250 in a direction opposite to the perpendicular direction was measured. An obtained result was that although the same amount of force F in the perpendicular direction was applied to the terminal end portion of the related cowl top cover general surface provided with no contact piece portion 300 and the terminal end portion of the cowl top cover general surface 250 of the embodiment, the amount D of displacement of the upper end portion 253 of the cowl top cover general surface 250 was almost half the amount D of displacement of the upper end portion of the related cowl top cover general surface. For this reason, if load is applied from the outside, the embodiment can allow no space or surface difference to occur in the position of alignment (section of contact) between the windshield 240 and the cowl top cover general surface 250, or inhibit the occurrence of space and surface difference to a large extent, compared with the related art in which no contact piece portion 300 is provided to the cowl top cover general surface.

Accordingly, since the contact piece portion 300 is provided to the tip end portion of the protruding claw 258 of the cowl top cover general surface 250, the embodiment can allow no space or surface difference to occur between the windshield 240 and the cowl top cover general surface 250, or inhibit the occurrence of space and surface difference to a large extent, even if load is applied to the cowl top cover general surface 250 due to variations in the position of attachment of the outer cowl top panel 209. Furthermore, even if load is applied due to force inputted through the bonnet 207, or the like, or even if load is applied to the cowl top cover general surface 250 due to the weight of snow, such as a pile of snow, on the cowl top cover 201, the embodiment can allow no space or surface difference to occur in the position of alignment (section of contact) between the windshield 240 and the cowl top cover general surface 250, or inhibit the occurrence of space and surface difference to a large extent. Consequently, since the embodiment can allow no space or surface difference to occur in the position of alignment (section of contact) between the windshield 240 and the cowl top cover general surface 250, or inhibit the occurrence of space and surface difference to a large extent, the embodiment can sufficiently prevent water from entering the engagement recessed portion 260 of the windshield fitting member 210, and sufficiently inhibit the momentum of the entering water.

It should be noted that the cowl top cover 201 of the embodiment is applicable to a whole range of vehicles equipped with the cowl top cover 201.

As described above, the embodiment of the present invention can provide the cowl section structure for a vehicle which is capable of: blocking, or inhibiting the momentum of, water which enters the gap between the cowl top cover general surface 250 and the windshield fitting member 210, even if load is put onto the cowl top cover general surface 250; and thus preventing the wiper component 296 from being splashed with water, and water from entering the air intake 198.

The foregoing descriptions have been provided for the embodiment of the present invention. Although the present invention has been described citing the specific concrete examples, various corrections and modifications may be made to these examples without departing from the broad gist and scope of the present invention which are defined in the scope of claims.

For example, the contact piece portion 300 may be projectingly provided to any place in the tip end portion of the protruding claw 258, as long as the contact piece portion 300 is provided in a way that the contact piece portion 300 projects from the tip end portion of the protruding claw 258. Furthermore, the contact piece portion 300 may be formed, for example as a 0.6 mm-thin piece portion shaped like a lip, in order to facilitate the seal effect. Instead, however, the contact piece portion 300 may be formed as a thinner piece, or as a thicker projecting piece shaped like a rib, as long as the contact piece portion 300 exerts the foregoing effect.

The invention claimed is:

1. A cowl section structure for a vehicle comprising:
a cowl top cover arranged between a bonnet and a windshield, and comprising a windshield fitting member provided to a lower end portion of the windshield and a protruding claw extending in a direction in which the protruding claw is inserted into an engagement recessed portion of the windshield fitting member; and
a contact piece portion arranged in a space between the protruding claw and the engagement recessed portion, one end of the contact piece portion coming into contact with a tip end portion of the protruding claw, and an opposite end of the contact piece portion coming into contact with an inner wall of the engagement recessed portion of the windshield fitting member.

2. The cowl section structure for a vehicle according to claim 1, wherein in a cross-sectional view in a front-rear direction of the vehicle, the contact piece portion has a linear shape extending in a same direction as the direction in which the protruding claw is inserted into the engagement recessed portion.

3. The cowl section structure for a vehicle according to claim 1, wherein in a cross-sectional view in a front-rear direction of the vehicle, the contact piece portion has a shape having a curvature in any one of a frontward direction or a rearward direction of the vehicle.

4. The cowl section structure for a vehicle according to claim 1, wherein the contact piece portion is formed integrally to the protruding claw as a single member, and projects from the tip end portion of the protruding claw.

* * * * *